Patented June 7, 1949

2,472,481

UNITED STATES PATENT OFFICE 2,472,481

METHOD OF PREPARING PTERINS

Martin E. Hultquist and Doris R. Seeger, Bound Brook, N. J., assignors to American Cyanamid Company, New York, N. Y., a corporation of Maine No Drawing. Application May 29, 1947, Serial No. 751,464

6 Claims. (Cl. 260—251)

The present invention relates to a new method of preparing substituted pterins. More particularly, it relates to the preparation of substituted 6-methyl amino pterins.

The process of the present invention comprises reacting 2,4,5-triamino-6-hydroxypyrimidine, an amide of para-aminobenzoic acid and a halogenated 1-chloro-3-acetoxyacetone. The general reaction may be illustrated by the following equation:

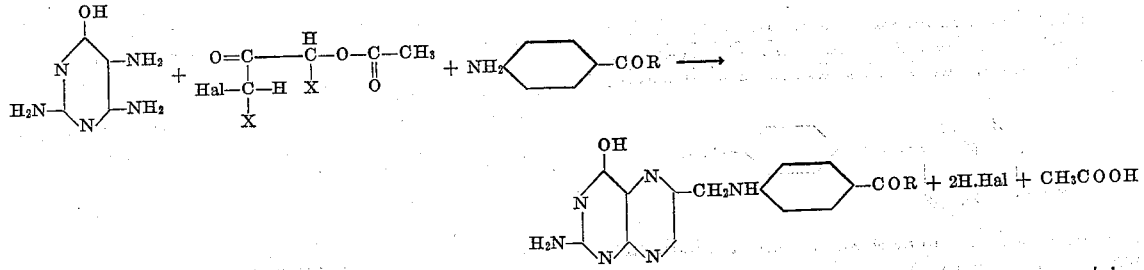

in which X is a member of the group consisting of hydrogen and halogen, one of which is halogen, Hal is halogen and R is a substituted amino radical.

The compound 2,4,5-triamino - 6 - hydroxypyrimidine is known. Although it most probably exists in the form illustrated, it may also exist in whole, or in part, in one or more tautomeric or resonant forms, such as, for example, 2,4,5-triamino-pyrimidone-6. As would be expected, these tautomeric forms react similarly and reference hereinafter to the one tautomer includes the like use of any of the various tautomers. The compound is usually used in the form of one of its salts, such as the sulfate or hydrochloride but, if desired, the free base may also be used.

Substituted acyloxy acetones are in general known compounds. The preparation of 1-chloro-3-acetoxy acetone is described by Hess and Fink, Berichte, 48, 2004 (1915). Although the equation shows the use of substituted acetoxy acetone, it will be understood that other substituted acetones may be used such as propionoxy acetones, butyroxy acetones and the like. Also, various halogenated acetoxy acetones such as 1,1-dichloro-3-acetoxyacetone; 1,3-dichloro-3-acetoxyacetone; 1,1-dibromo-3-acetoxyacetone; 1,3-dibromo - 3 - acetoxyacetone; 1-chloro-1-bromo-3-acetoxyacetone; 1-bromo-3-chloro-3-acetoxyacetone, and the like can be used.

The carbonyl radical, with its substituent R, represents an amide. The amides preferred are those formed by reaction of para-aminobenzoic acid and an amino acid, as the final products possess the most useful biological properties when this is so. The preferred amino acid amide is that of glutamic acid although other amino acid amides such as those of glycine, aspartic acid, alanine, isovaline, cysteine and the like with para-aminobenzoic acid may be used. The salts and esters of these amino acid amides may also be used in the process.

In carrying out the reaction of the present invention, the hydrogen ion concentration may vary from a pH of 1 or even less, up to about pH 7. Best results are obtained within the range pH 1 to pH 5.

The temperature used in carrying out the reaction may vary from about 0° C. up to about 60° C.

The reactants can be added to each other in various orders, however, it is preferred that the three principal reactants are mixed together at the same time. This latter method tends to minimize side reactions between two of the reactants which may result in products not forming a part of the desired compound.

The compound pteroylglutamic acid has recently been found useful in the treatment of sprue, macrocytic anemias and related diseases of the blood.

The process will now be illustrated in greater detail in the following example. The process, however, is by no means limited to the particular conditions of these examples. All parts are by weight unless otherwise indicated.

Example

To 13.6 parts of 1-chloro-3-acetoxyacetone dissolved in 26 parts of glacial acetic acid is added a solution of 14.5 parts of bromine in 10.5 parts of glacial acetic acid. The bromine solution is added during an hour with simultaneous irradiation by an ultra violet lamp after which the reaction mixture is stirred for another hour without the lamp.

To 12 parts of para-aminobenzoylglutamic acid and 21.1 parts of 2,4,5-triamino-6-hydroxypyrimidine sulfate is added 635 parts of water and sodium hydroxide sufficient to give the mixture a pH of 3. After adjusting the temperature to 40° C., the brominated solution of 1 chloro-3-acetoxyacetone is added during 15 minutes with enough sodium hydroxide to maintain the pH at 3. The mixture is then stirred for an additional 15 minutes at 40° C. and at a pH of 3 and is then allowed to stand overnight at room temperature before filtering. The dried crude pteroylglutamic acid (20.4 parts) shows an analysis of 16.6% by chemical assay and 7.29% by bioassay on *S. faecalis* R and 12.2% by bioassay on *L. casei*.

This product can be used as an adjunct to animal feed. Should a product of higher purity be desired, for use as a therapeutic agent for humans, then the product can be further purified by the method described in the copending application of Brian L. Hutchings, Serial No. 669,099, filed May 11, 1946, now Patent No. 2,457,375.

We claim:

1. A method which comprises reacting together 2,4,5-triamino-6-hydroxypyrimidine, an amide of para-aminobenzoic acid and a compound having the formula:

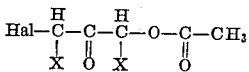

in which X is a member of the group consisting of hydrogen and halogen, one of which is halogen, whereby compounds having the general formula,

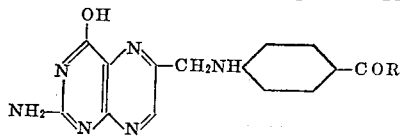

in which R is a substituted amino radical, are produced and recovered.

2. A method which comprises reacting together 2,4,5-triamino-6-hydroxypyrimidine, an amino acid amide of para-aminobenzoic acid and a compound having the formula:

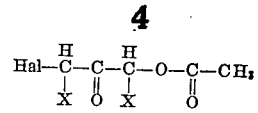

in which X is a member of the group consisting of hydrogen and halogen, one of which is halogen, whereby compounds having the general formula,

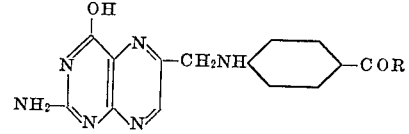

in which R is a substituted amino radical, are produced and recovered.

3. A method which comprises reacting together 2,4,5-triamino - 6 - hydroxypyrimidine, para-aminobenzoyl glutamic acid and a compound having the formula:

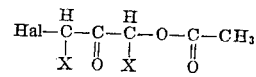

in which X is a member of the group consisting of hydrogen and halogen, one of which is halogen, whereby pteroylglutamic acid is produced and recovered.

4. A method which comprises reacting together 2,4,5-triamino - 6 - hydroxypyrimidine, para-aminobenzoyl glutamic acid and 1-chloro, 1-bromo-3-acetoxyacetone whereby pteroylglutamic acid is produced and recovered.

5. A method which comprises reacting together 2,4,5-triamino - 6 - hydroxypyrimidine, para-aminobenzoyl glutamic acid and 1,1-dibromo-3-acetoxyacetone whereby pteroylglutamic acid is produced and recovered.

6. A method which comprises reacting together 2,4,5-triamino - 6 - hydroxypyrimidine, para-aminobenzoyl glutamic acid and 1-chloro, 1,3-dibromo-3-acetoxyacetone whereby pteroylglutamic acid is produced and recovered.

MARTIN E. HULTQUIST.
DORIS R. SEEGER.

No references cited.